United States Patent
Saint Clair et al.

(10) Patent No.: US 7,701,592 B2
(45) Date of Patent: Apr. 20, 2010

(54) METHOD AND APPARATUS FOR COMBINING A TARGETLESS OPTICAL MEASUREMENT FUNCTION AND OPTICAL PROJECTION OF INFORMATION

(75) Inventors: Jonathan M. Saint Clair, Seattle, WA (US); Mitchell D. Voth, Sumner, WA (US); David C. Soreide, Seattle, WA (US); William D. Sherman, Renton, WA (US)

(73) Assignee: The Boeing Company, Chicago, IL (US)

( * ) Notice: Subject to any disclaimer, the term of this patent is extended or adjusted under 35 U.S.C. 154(b) by 415 days.

(21) Appl. No.: 11/016,623

(22) Filed: Dec. 17, 2004

(65) Prior Publication Data

US 2006/0132803 A1 Jun. 22, 2006

(51) Int. Cl.
*G01B 11/14* (2006.01)
(52) U.S. Cl. .................. 356/614; 356/5.11; 356/622
(58) Field of Classification Search ......... 345/601–623, 345/5.11; 356/601–623, 5.11
See application file for complete search history.

(56) References Cited

U.S. PATENT DOCUMENTS

| | | | |
|---|---|---|---|
| 4,615,621 A * | 10/1986 | Allen et al. ................. 356/399 |
| 4,818,100 A * | 4/1989 | Breen ......................... 356/5.06 |
| 4,900,940 A * | 2/1990 | Nakamura ............. 250/559.23 |
| 5,030,824 A | 7/1991 | Babbitt |
| 5,155,558 A * | 10/1992 | Tannenbaum et al. ....... 356/446 |
| 5,294,075 A | 3/1994 | Vertatschitsch et al. |
| 5,298,975 A * | 3/1994 | Khoury et al. .............. 356/624 |
| 5,341,183 A | 8/1994 | Dorsey-Palmateer |
| 5,371,587 A | 12/1994 | de Groot et al. |
| 5,450,147 A | 9/1995 | Dorsey-Palmateer |
| 5,506,641 A | 4/1996 | Dorsey-Palmateer |
| 5,651,600 A | 7/1997 | Dorsey-Palmateer |
| 5,903,459 A | 5/1999 | Greenwood et al. |
| 5,949,685 A | 9/1999 | Greenwood et al. |
| 6,547,397 B1 | 4/2003 | Kaufman et al. |
| 6,681,145 B1 | 1/2004 | Greenwood et al. |
| 6,736,180 B2 | 5/2004 | Anderson et al. |
| 6,901,673 B1 | 6/2005 | Cobb et al. |
| 7,015,459 B2 | 3/2006 | Slesinski et al. |
| 7,079,249 B2 * | 7/2006 | Nicolaides et al. .......... 356/432 |
| 7,181,363 B2 * | 2/2007 | Ratti et al. ................... 702/159 |
| 7,194,326 B2 | 3/2007 | Cobb et al. |
| 7,268,893 B2 | 9/2007 | Palmateer |
| 7,307,700 B1 * | 12/2007 | Leep et al. ................. 356/5.15 |
| 7,372,558 B2 | 5/2008 | Kaufman et al. |
| 2003/0033041 A1 | 2/2003 | Richey |
| 2006/0290917 A1 * | 12/2006 | Soreide et al. ............. 356/5.11 |

OTHER PUBLICATIONS

Capps et al, Video Photogrammetry System Used to Measure Deformations of International Space Station Module, Boeing Information, Space and Defense Systems, Apr. 9, 1997.
Sherman et al, Laser Tracker for Radar Calibration Sphere Position Measurement, Boeing Defense and Space Group - Aerospace and Electronics Division, Aug. 1990.

* cited by examiner

*Primary Examiner*—Hoa Q Pham
(74) *Attorney, Agent, or Firm*—Toler Law Group

(57) ABSTRACT

Systems and methods are provided for targetless optical measurement and optical information projection. A non-contact optical measurement device is provided for determining at least one of position and orientation of a workpiece. A projector is provided for projecting a part definition on the workpiece. Advantageously, beams from the non-contact optical measurement device and the projector pass through common optics.

21 Claims, 8 Drawing Sheets

METHOD AND APPARATUS FOR COMBINING A TARGETLESS OPTICAL MEASUREMENT FUNCTION AND OPTICAL PROJECTION OF INFORMATION

FIELD OF THE INVENTION

This invention relates generally to metrology and, more specifically, to optical measurement systems and methods.

BACKGROUND OF THE INVENTION

In manufacturing operations, complicated assemblies and contoured parts are often mated to other complicated assemblies and parts. A variety of techniques are currently used to locate the assemblies and parts for mating.

For example, some assembly techniques use factory aids such as templates that are made out of paper, Mylar™, or the like to find reference targets for accurately placing smaller parts on larger parts. These factory aids are subject to wear and tear and, as a result, are replaced from time-to-time. The factory aids must be replaced when engineering changes are made. Also, errors may be made by manufacturing personnel when using the factory aids. All of these aspects of the factory aids introduce additional costs into the manufacturing operation.

In other assembly techniques, a laser tracker measures coordinates of a number of reference targets of known design points on a large part. In this case, the large part is assumed to have been built identically to a defined design. This technique allows the laser tracker to "buck" into the part's coordinate system, or to locate precisely the coordinate system of the tracker with respect to the coordinate system of the part. When a smaller part is to be mounted onto a larger part, a laser tracker with a visible beam points onto the larger part and can thus designate the mounting position to guide the mechanic in the assembly.

However, this technique only gives one point indicating the location of the part. Typical laser trackers are not able to directly measure the coordinates of the mounted hardware relative to the reference targets or other mounted hardware. This is because typical laser trackers only measure off retro-reflective targets, and because the line-of-sight path between the laser and the retro-reflective targets is blocked.

Use of retro-reflective targets introduces additional time and labor costs into manufacturing operations. Most retro-reflectors must be positioned within a small range of angles to be useful, so time and effort are expended setting up the targets. Further, the retro-reflectors must be periodically pointed and re-pointed to remain within the useful range of angles. Because of their angle-sensitivity and time requirements, retro-reflectors are not able to be used to make measurements in a production line as part of the production process. Instead, retro-reflectors are typically set up and measurements are typically performed on back shifts, such as a midnight shift, when production operations are not being performed.

Further, laser trackers cannot provide the factory aid function described above, such as would provide information about how the part should be oriented. If information regarding orientation of the part is desired, then the desired orientation information is currently provided by a different system using a different laser that passes through a laser galvanometer scanner that is positioned next to the laser tracker. The scanner motor and mirrors are much more agile than those of the laser tracker, such that a pattern may be drawn at an update rate that appears to be a projected pattern.

To project the pattern, the projector needs to know the part definition and the position of the tool and/or workpiece onto which it projects the pattern. The laser radar allows the projector to acquire the position of the tool and/or workpiece. Because known systems use a separate tracker and a separate projector, the relative positions of the tracker and the projector need to be known and resolved, especially when operating at tolerances on the order of $\frac{1}{1000}$ inch or less for critical operations.

It would be desirable to perform measurements without retro-reflectors and project information using a single system. However, there is an unmet need in the art for a system and method for performing measurements without retro-reflectors and for projecting information with the same system.

SUMMARY OF THE INVENTION

Embodiments of the present invention provide a system and method for targetless optical measurement and optical information projection. According to the present invention, one system is used instead of two separate systems for measuring and for projecting information. As a result, position of one system does not have to be calibrated relative to the other system. This can eliminate a major source of error in conventional systems between initial measurement of a part and relative positioning of projection of a pattern or information. This can also reduce cost of the system because elements are shared between measurement and projection functions.

Also, measurements can be made without use of retro-reflectors. As a result, embodiments of the present invention advantageously may be used to make measurements and project information on-line as part of the production process. This can cut flow time for assembly while enhancing accuracy and reducing undesired rework.

According to embodiments of the invention, systems and methods are provided for targetless optical measurement and optical information projection. A non-contact optical measurement device is provided for determining at least one of position and orientation of a workpiece. A projector is provided for projecting a part definition on the workpiece. Advantageously, beams from the non-contact optical measurement device and the projector pass through common optics.

According to another embodiment of the present invention, a system is provided for targetless optical measurement and optical information projection. A first non-time-of-flight laser is configured to project a first laser beam onto a surface of a part under measurement. A range measurement component is configured to receive reflection from the first laser reflecting off the surface of the part under measurement, and the range measurement component is arranged to determine range and orientation of the surface of the part under measurement relative to the first laser. A second laser is configured to project a second laser beam onto the surface of the part under measurement. The second laser beam has a wavelength within the visible light spectrum, and the second laser beam is co-aligned with the first laser beam. A scanning apparatus is configured to direct the second laser beam over the surface of the part under measurement in a pattern of visible light.

According to an aspect of the present invention, the first laser beam may be an infrared laser beam. In this case, the first laser and the range measurement component may be provided as a laser radar. If desired, the laser radar may be a chirped synthetic wave radar.

According to another aspect of the present invention, the first laser beam may have a wavelength within the visible light spectrum. In this case, the range measurement component may include a plurality of video cameras that are arranged to triangulate a spot that is defined by the first laser beam on the surface of the part under measurement.

According to another aspect of the present invention, the scanning apparatus may include first and second scanning mirrors that are driven by first and second scanning galvanometers, respectively, having first and second axes that are substantially perpendicular to each other. In this case, an envelope of the first and second laser beams scanned with the first and second mirrors maps out an approximate right pyramid. If desired, the scanning apparatus may further include a third mirror that is driven by a third scanning motor that is integrated with an angle encoder, such as a precision angle encoder. The third mirror is oriented around 45 degrees or so with respect to its rotation axis (that is substantially perpendicular to the axis of rotation of the second galvanometer). The third mirror may be driven substantially 360 degrees about the third axis. In this case, an envelope of the first and second laser beams scanned with the first, second, and third mirrors maps out a cylindrical shell with an angular width of the right pyramid. By incorporating commercial-off-the-shelf components, the scanning apparatus provides scanning capabilities of a gimbal at a fraction of the cost.

BRIEF DESCRIPTION OF THE DRAWINGS

The preferred and alternative embodiments of the present invention are described in detail below with reference to the following drawings.

DETAILED DESCRIPTION OF THE INVENTION

Embodiments of the present invention provide a system and method for targetless optical measurement and optical information projection. According to the present invention, one system is used instead of two separate systems for measuring and for projecting information. As a result, position of one system does not have to be calibrated relative to the other system. This can eliminate a major source of error in conventional systems between initial measurement of a part and relative positioning of projection of a pattern or information. This can also reduce cost of the system because elements are shared between measurement and projection functions. Also, measurements can be made without use of retro-reflectors. As a result, embodiments of the present invention advantageously may be used to make measurements and project information on-line as part of the production process.

Figure 1A:
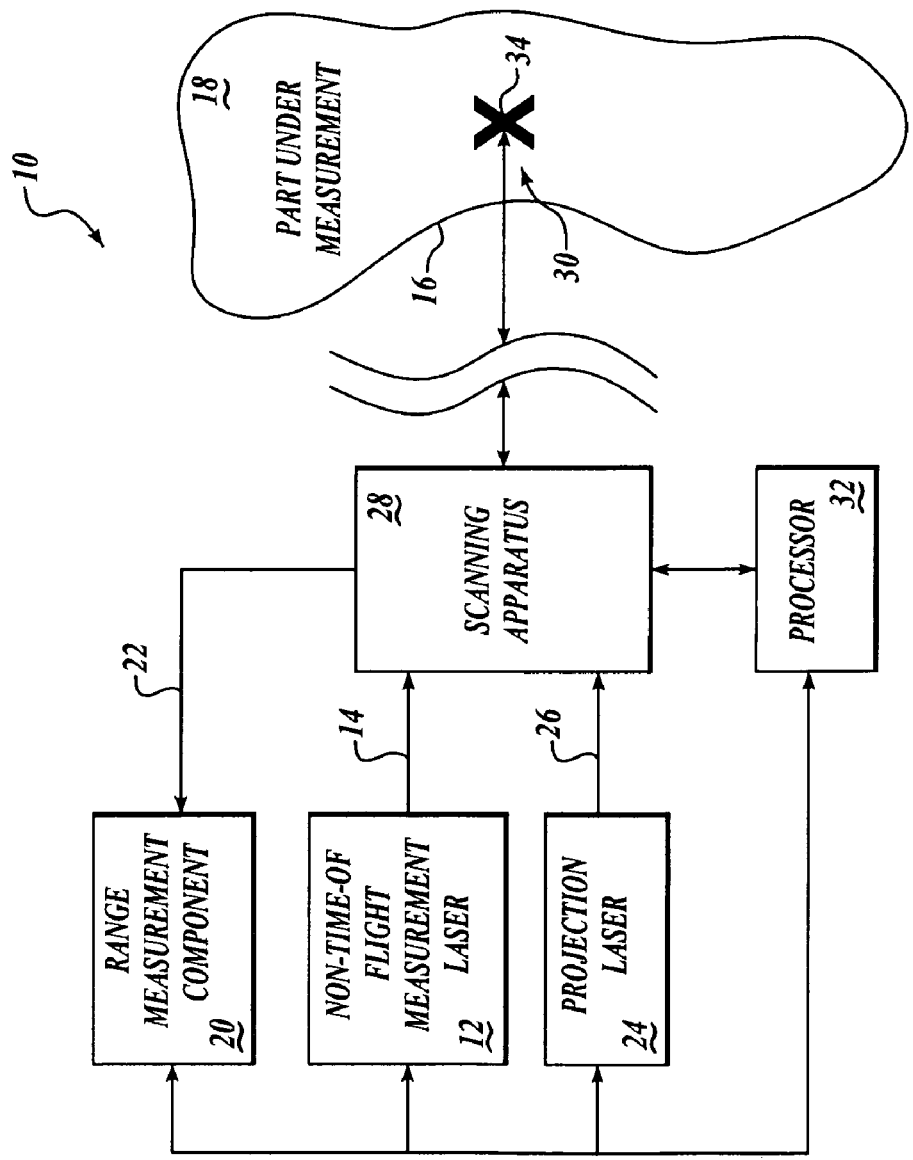
FIGS. 1A, 1B, and 1C are high-level block diagrams of embodiments of the present invention.

By way of overview and referring to FIG. 1A, an exemplary embodiment of the present invention provides a system 10 for targetless optical measurement and optical information projection. A first non-time-of-flight laser 12 is configured to project a first laser beam 14 onto a surface 16 of a part 18 under measurement. A range measurement component 20 is configured to receive reflection 22 from the first laser 12 reflecting off the surface 16, and the range measurement component 20 is arranged to determine range and orientation of the surface 16 relative to the first laser 12. A second laser 24 is configured to project a second laser beam 26 onto the surface 16. The second laser beam 26 has a wavelength within the visible light spectrum, and the second laser beam 26 is co-aligned with the first laser beam 14. A scanning apparatus 28 is configured to direct the second laser beam 26 over the surface 16 in a pattern 30 of visible light. A processor 32 controls the first non-time-of-flight laser 12, the second laser 24, the range measurement component 20, and the scanning apparatus 28.

In one exemplary embodiment given by way of non-limiting example, the first laser beam 14 is an infrared laser beam. In another exemplary embodiment, the first laser beam 14 may be a visible laser beam or a near-infrared laser beam. Exemplary implementations of optical components, the scanning apparatus 28, software components, and electronic components will also be explained.

Figure 1B:
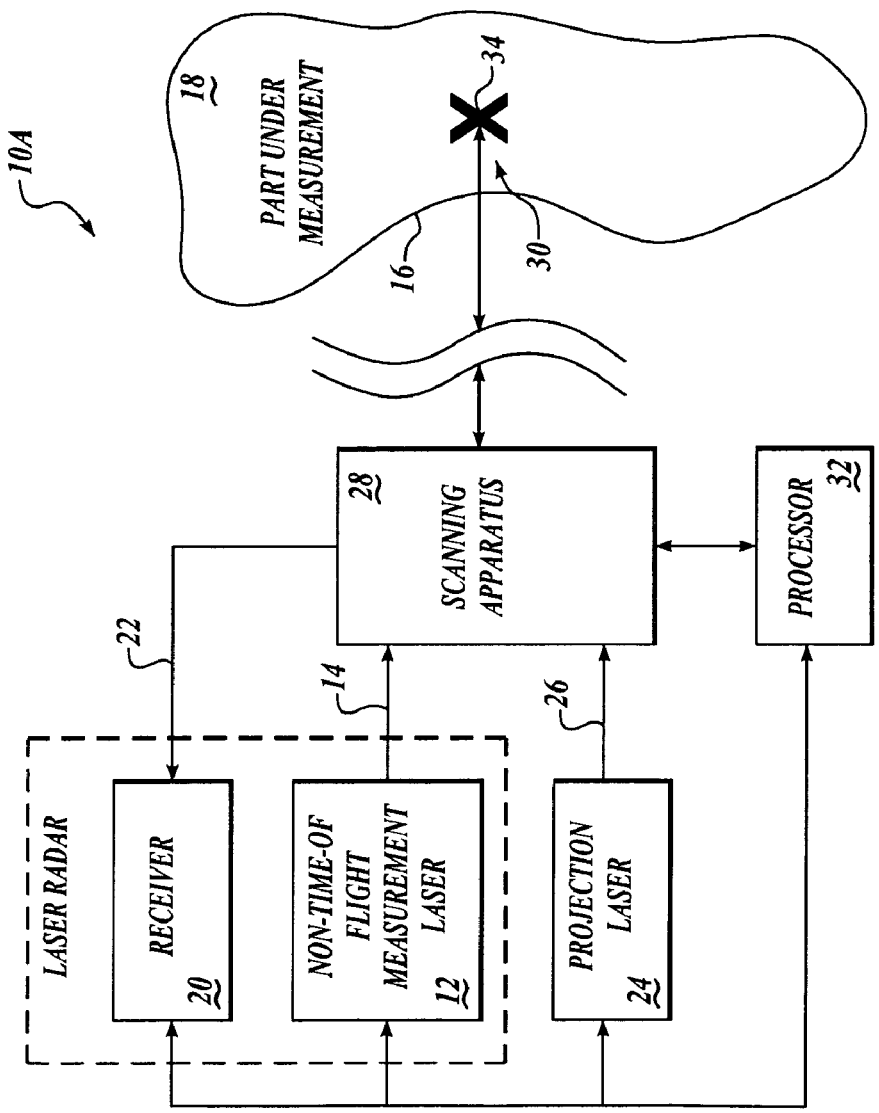

Referring now to FIG. 1B, in one embodiment of a system 10A the first laser beam 14 is a near-infrared laser beam. The laser 12 may be a thermoelectrically cooled (TEC) laser, if desired. The first laser beam 14 suitably has a wavelength within a range from around 880 nanometers (nm) to around 950 nm. However, the first laser beam 14 may have any wavelength as desired for a particular measurement application.

In one presently preferred embodiment, the first laser beam 14 has a wavelength of around 880 nm. Advantageously, the first non-time-of-flight laser 12 may be provided (along with the range measurement 20) as a laser radar, such as without limitation a chirped synthetic wave (CSW) laser radar. Advantageously, a CSW laser radar has a signal-to-noise ratio that is high enough to measure coordinates of a randomly rough surface or feature (that is, a non-cooperative target). However, a CSW laser radar suitably may also be used to measure coordinates of a cooperative target, such as a retro reflector. CSW laser radars are known in the art. Given by way of non-limiting example, a suitable laser radar is described in U.S. Pat. No. 5,371,587, the entire contents of which are incorporated by reference. Details of signal processing for measuring range to the part 18 under measurement with a CSW laser radar are set forth in U.S. Pat. No. 7,307,700, the entire contents of which are incorporated by reference.

In addition to a CSW laser radar, any suitable type of non-time-of-flight laser metrology device may be used as desired for a particular measurement application. Given by way of non-limiting example, suitable types of non-time-of-flight laser metrology devices include, without limitation, laser radars based on frequency modulation, multi-tone frequency modulation, multi-tone amplitude modulation, coherent detection, and multi-wavelength frequency modulated interferometers, and the like.

Referring now to FIGS. 1A and 1B, when the range to the part 18 under measurement is measured by the first laser beam 14 that has a wavelength that is within the infrared spectrum, optical information is communicated in the visible light spectrum by the second laser beam 26. The laser 24 may be a thermoelectrically cooled (TEC) laser, if desired. In one presently preferred embodiment, the second laser beam 26 suitably is a green laser beam with a wavelength of around 532 nm. However, the second laser beam 26 may have any wavelength as desired within the visible light spectrum. In this exemplary embodiment, the second laser beam 26 is provided by the second laser 24 that is separate from the first non-time-of-flight laser 12. For example, the second laser 24 suitably is a known laser, such as NVG, Inc.'s model SM635-5 laser diode, operating at 635 nm, with 5 mW power. Such devices are commercially available at various wavelengths between 635 nm to 670 nm from a variety of vendors.

Figure 1C:
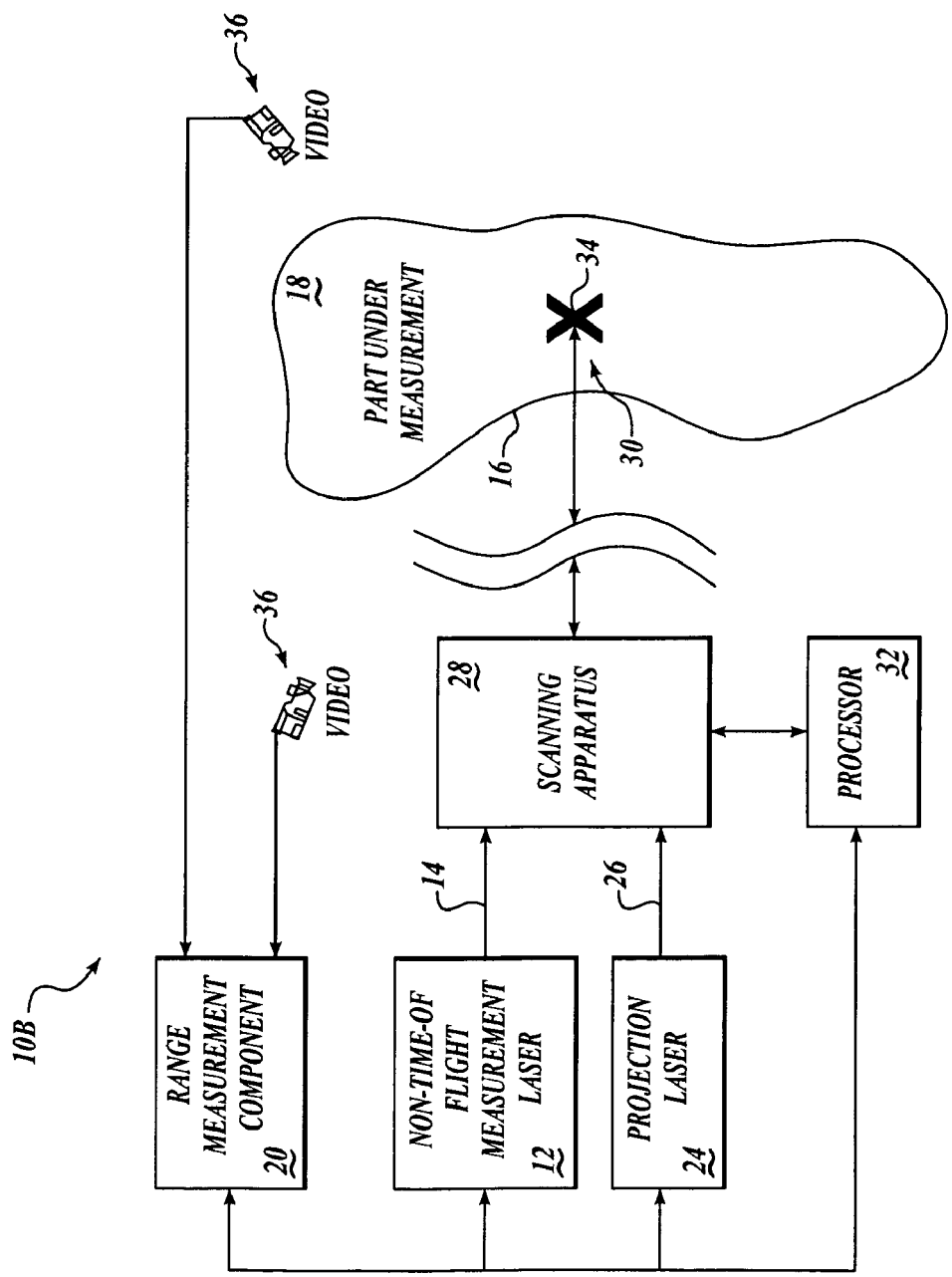

Referring now to FIGS. 1A and 1C, in another embodiment of a system 10B, the first laser beam 14 may have a wavelength within the visible light spectrum or within the near-infrared spectrum. In this case, the first laser beam 14 defines a spot 34 on the surface 16 of the part 18 under measurement. The near-infrared spectrum advantageously is invisible to the human eye and does not interfere with the normal work environment.

The range measurement component 20 suitably includes a plurality of video cameras 36 that are arranged to triangulate the spot 34 that is defined by the first laser beam 14. However, if desired, the video cameras 36 may also triangulate on retro-reflective targets. The video cameras 36 suitably are digital cameras, such as charge-coupled device (CCD) digital cameras. By way of non-limiting example, a suitable CCD digital camera includes without limitation a Kodak Megaplus CCD digital output camera with 1320×1035 pixels and a maximum frame rate of around 10 Hz. Such digital cameras operate in both the near-infrared spectrum and the visible light spectrum.

The second laser beam 26, operating within the visible light spectrum, is especially well-suited when the surface 16 of the part 18 under measurement is a randomly rough surface. Advantageously in this case, the first laser beam 14 and the second laser beam 26 may be generated from the same laser. However, the first laser beam 14 and the second laser beam 26 may be generated by separate lasers, if desired.

Figure 2:
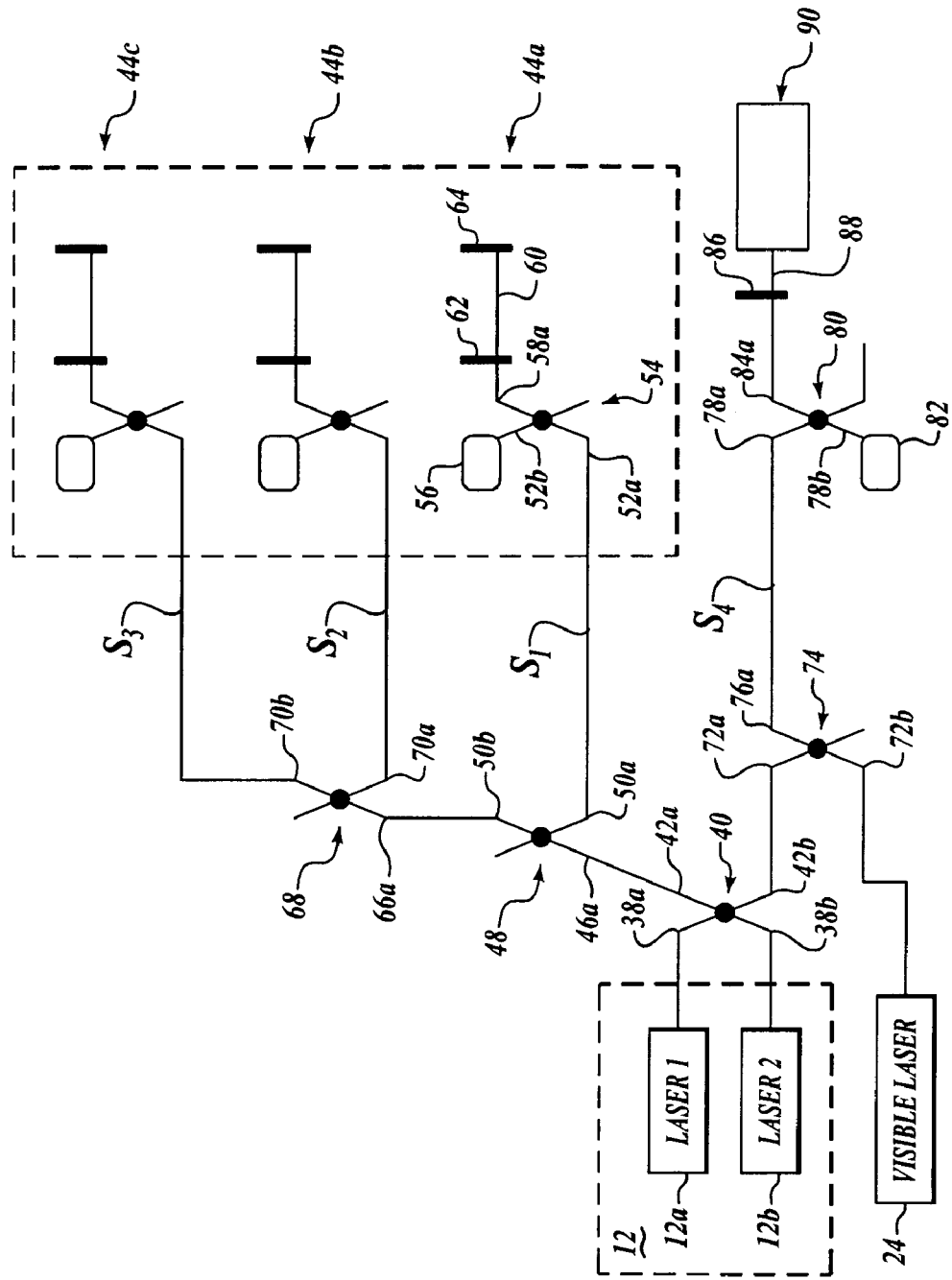
FIG. 2 is a block diagram of optical components of the system of FIG. 1B.

Referring now to FIG. 2, the first non-time-of-flight laser 12 may include lasers 12a and 12b. The lasers 12a and 12b may be thermoelectrically cooled (TEC) lasers, if desired. Outputs of the lasers 12a and 12b are optically coupled to input terminals 38a and 38b of an optical splitter/combiner 40. Optical transport among components described herein for laser beam generation suitably is accomplished with optical fibers.

An output terminal 42a of the optical splitter/combiner 40 is coupled to provide optical signals for reference channels 44a, 44b, and 44c. These reference channels are fixed reference lengths for absolute calibration, which reference lengths are measured simultaneously with each measurement of the distance to the part.

The output terminal 42a is coupled to an input terminal 46a of a splitter/combiner 48. An output terminal 50a of the splitter/combiner 48 routes the modulated laser light to the reference channel 44a. The modulated laser light is provided to an input terminal 52a of a splitter/combiner 54 and an input of a photodiode 56 is provided to an output terminal 52b of the splitter/combiner 54. An output terminal 58a of the splitter/combiner 54 is coupled to an optical fiber 60 that has flat, polished fiber ends 62 and 64 that provide for partial reflection. The partial reflection defines the end points of the length of the reference channels, defined by the distance between the ends 62 and 64. The light from the partial reflection propagates back through splitter/combiner 54 to the input of the photodiode 56 through output terminal 52b where they interfere on photodiode 56. The electrical signal generated by photodiode 56 carries the information to measure the reference length signal of channel 44a.

An output terminal 50b of the splitter/combiner 48 is coupled to an input terminal 66a of a splitter/combiner 68. An output terminal 70a of the splitter/combiner 68 provides the modulated laser light to the reference channel 44b, and an output terminal 70b of the splitter/combiner 68 provides the modulated laser light to the reference channel 44c. The reference channels 44b and 44c are constructed similar to the reference channel 44a. For the sake of brevity, details of their construction need not be repeated for an understanding of the present invention.

An output terminal 42b of the splitter/combiner 40 is coupled to provide output of the first non-time-of-flight laser 12 to an input terminal 72a of a splitter/combiner 74. Output of the projection laser 24 is provided to an input terminal 72b of the splitter/combiner 74. The output of both of the lasers 12 and 24 is provided from an output terminal 76a of the splitter/combiner 74 as modulated laser light to an input terminal 78a of a splitter/combiner 80. Output of splitter/combiner 80, terminal 78b, is provided to the input of photodiode 82. An output terminal 84a is coupled to a flat, polished end 86 of an optical fiber 88. The optical fiber 88 is coupled to an output telescope 90. Laser light from an object being measured is combined with the light reflected from the flat polished end 86 and routed through combiner splitter 80 to photodiode 82 where the interference between these two beams interferes, thereby generating an electrical signal that encodes the distance to the object being measured. Advantageously, the laser beams 14 and 26 are output collinearly—that is, co-aligned—from the output telescope 90 and are provided to the scanning apparatus 28 (FIGS. 1A, 1B, and 1C). This permits the system 10 to be positioned without a need to calibrate position of the laser beam 12 relative to position of the laser beam 24. This can eliminate a major source of error in conventional systems between initial measurement of a part and relative positioning of projection of a pattern or information.

In a presently preferred embodiment, the scanning apparatus 28 is a programmable, rapid beam-steering (scanning) mechanism that directs a visible light beam, such as the laser beam 26, onto a surface, such as the surface 16, with sufficient speed to act as a display of geometric patterns and/or alphanumeric characters projected onto a part (with correct orientation and position on the part). However, the scanning apparatus is also preferably usable to direct the measurement laser beam 14 onto the surface 16. In one presently preferred embodiment, the scanning apparatus 28 directs both of the laser beams 14 and 26 onto the part 16. Advantageously, the scanning apparatus suitably is made from readily-available, commercial-off-the-shelf components, such as mirrors, motors, and encoders. By incorporating commercial-off-the-shelf components, the scanning apparatus 28 provides scanning capabilities of a gimbal at a fraction of the cost.

The components shown in FIG. 2 and described above are similar to optoelectronic components shown and described in U.S. Pat. No. 7,307,700, the entire contents of which are incorporated by reference. Further, embodiments of the present invention may use more than two lasers and/or more than three reference channels as desired for a particular application.

Figure 3A:
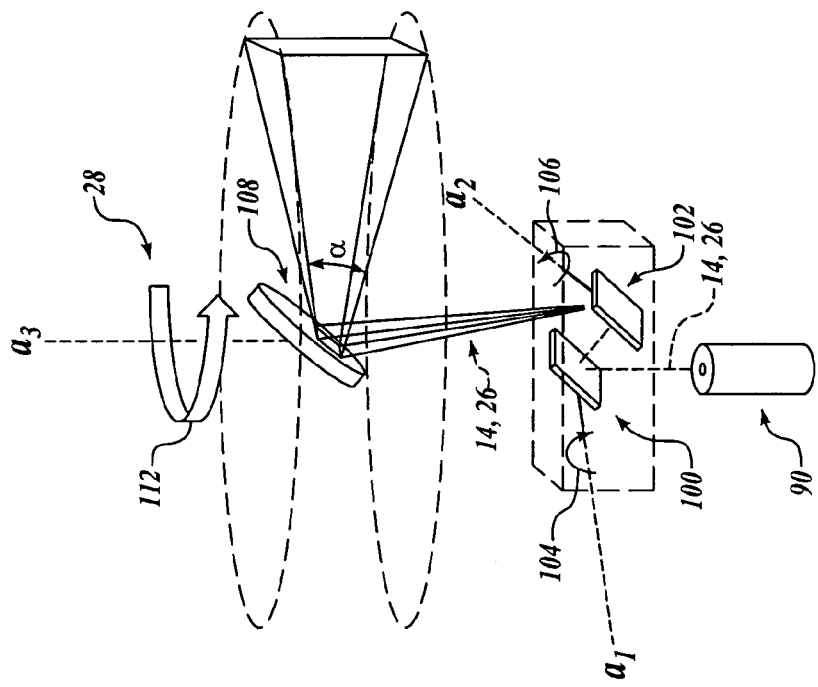
FIGS. 3A and 3B are perspective views of components of a scanning apparatus of the systems of FIGS. 1A-1C.
Figure 3B:
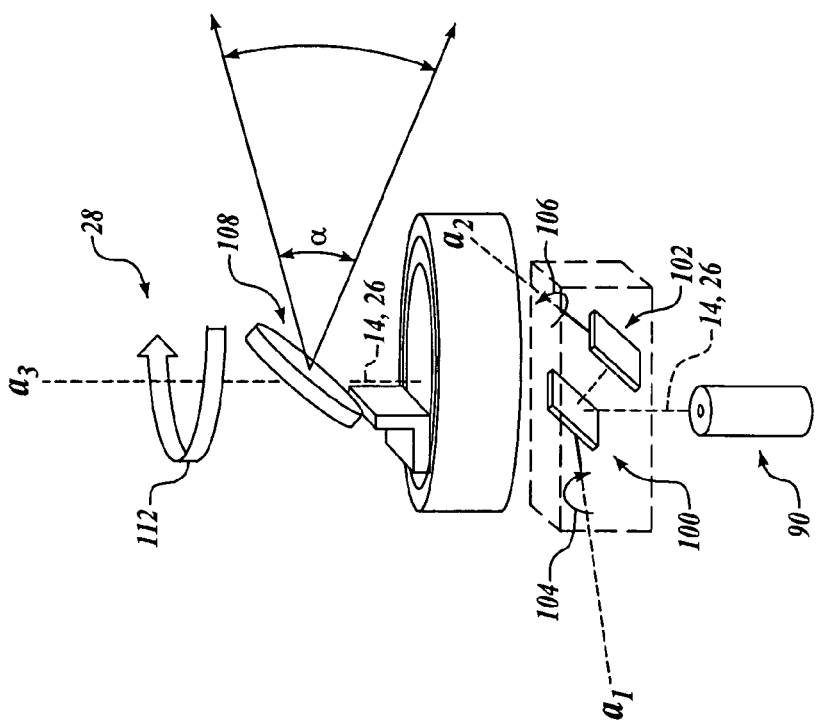

Referring now to FIGS. 3A and 3B, in one embodiment the scanning apparatus 28 includes first and second scanning mirrors 100 and 102, respectively. The first and second mirrors 100 and 102 are driven by first and second scanning galvanometers, respectively, (not shown). The first and second galvanometers have first and second axes $a_1$ and $a_2$ that are substantially perpendicular to each other. The first and second galvanometers rotate the first and second mirrors 100 and 102 about the axes $a_1$ and $a_2$, respectively, in directions shown by arrows 104 and 106, respectively. The mirrors 100 and 102 are rotated at a rate that is around the same rate, and preferably no slower than, a refresh rate of the laser 24 that generates the pattern 30 to provide substantially flicker-free viewing of the projected pattern. A common refresh rate is around 30 updates/sec. However, any refresh rate may be used as desired for a particular application. In this exemplary embodiment, an envelope of the first and second laser beams 14 and 26 scanned with the first and second mirrors 100 and 102 maps out an approximate right pyramid.

If desired, the scanning apparatus 28 may further include a third mirror 108 that is driven by a third scanning motor 110 having a third axis $a_3$ that is substantially mutually perpendicular to the second axis $a_2$. The motor 110 suitably is a rotary stage motor and associated encoder, each with a hollow center. The encoder suitably is a precision angle encoder. Advantageously, the laser beams 14 and 26 pass through the hollow center of the motor and are permitted to optically communicate with the mirror 108 without interference. The third mirror 108 may be driven substantially 360 degrees about the third axis $a_3$ in a direction as shown by an arrow 112. In this exemplary embodiment, an envelope of the first and second laser beams 14 and 26 scanned with the first, second, and third mirrors 110, 102, and 108, respectively, maps out a cylindrical shell with an angular width $\alpha$ of the right pyramid. In one exemplary embodiment given by way of non-limiting example, the angular width $\alpha$ of the right pyramid may be around +/−20 degrees or so. However, any angular width $\alpha$ may be selected as desired for a particular application.

Figure 4:
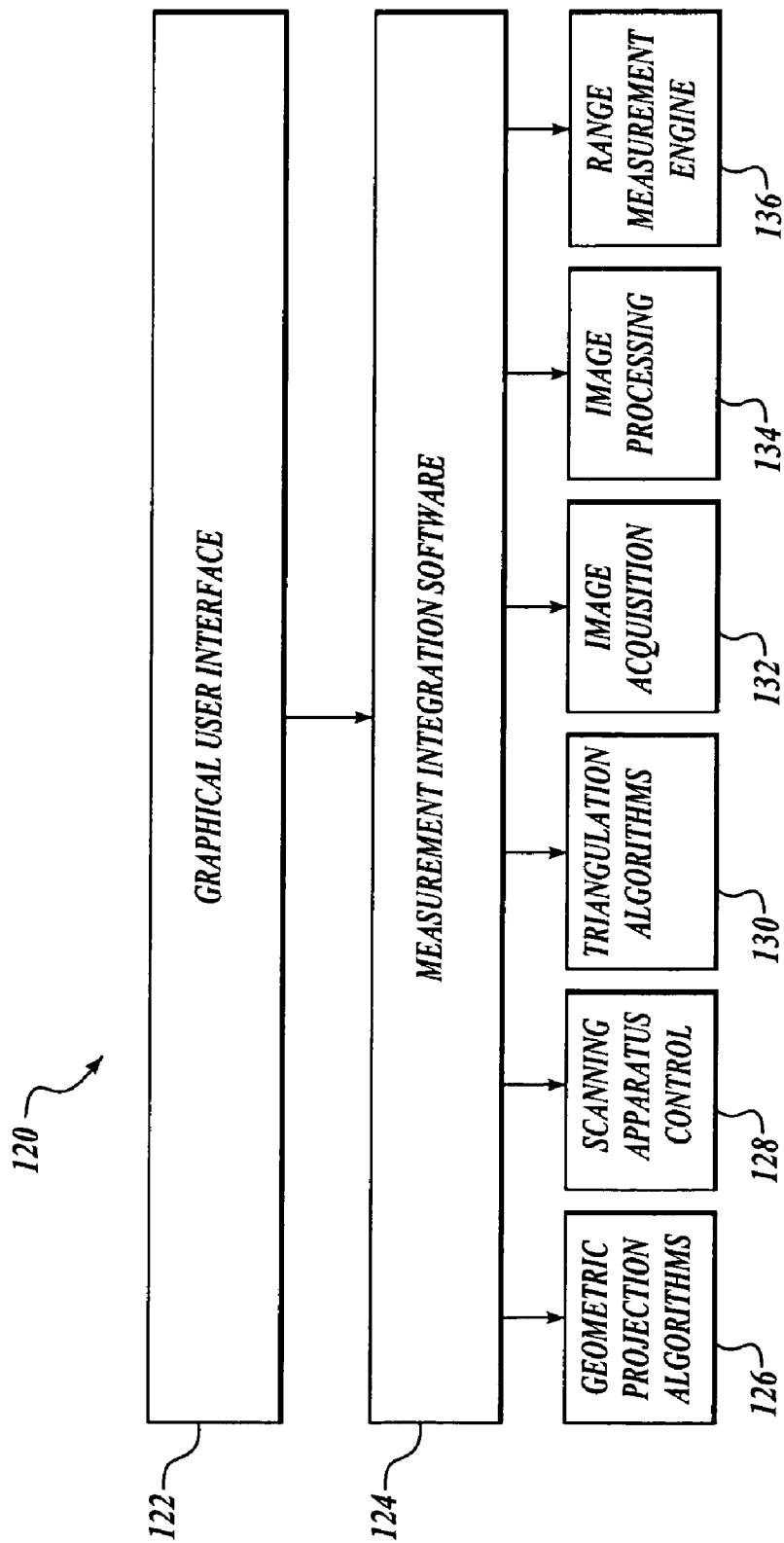
FIG. 4 is a top-level software block diagram of an embodiment of the present invention.
Figure 5:
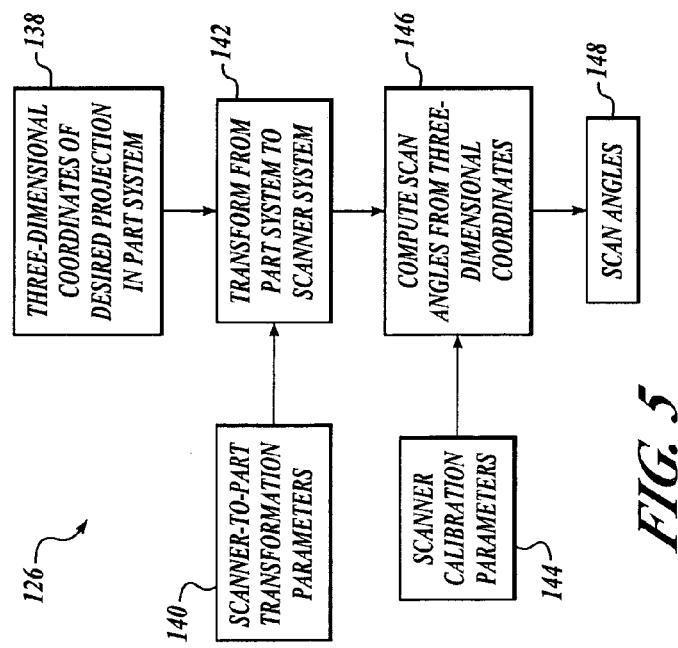
FIG. 5 is a functional block diagram of an exemplary geometric projection algorithm.

Referring now to FIG. 4, software 120 resides on the processor 32 (FIGS. 1A-1C) and controls functions of the systems 10, 10B, and 10C (FIGS. 1A-1C). A user interface 122, such as a graphical user interface, allows a user to interact with the system and select functions and parameters as desired for a particular application. Measurement integration software 124 interfaces with the user interface 122 and controls measurement functionality in response to selections communicated by the user interface 122.

The measurement integration software 124 controls the following measurement functionality: a geometric projection algorithm 126; scanning apparatus control 128; triangulation algorithms 130; image acquisition algorithms 132; image processing algorithms 134; and a range measurement engine 136. A brief description of each of these functionalities will be set forth below.

Referring additionally to FIGS. 1A-1C and 5, the geometric projection algorithm 126 computes scan angles for the laser beam 26, thereby permitting the laser beam 26 to trace the pattern 30 on the surface 16 regardless of contours, angles, roughness, or any irregularity of the surface 16 other than direct line-of-sight obscuration. At a block 138, three-dimensional coordinates (in the system of coordinates of the part 18) of the pattern 30, such as an alphanumeric character or the like, are calculated using projective geometry, and known part definition.

At a block 140, scanner-to-part transformation parameters are calculated by performing an optimized best-fit of multiple points of surface 16 previously measured by the system 10, 10A, or 10B, to the three-dimensional design of surface 16, such as a computer aided design (CAD) model. The scanner-to-part transformation parameters permit three-dimensional coordinates that define a location in the coordinate system of the part 18 to be converted to three-dimensional coordinates that define the location in the coordinate system of the system. At a block 142, the three-dimensional coordinates from the block 138 are transformed from the system of coordinates of the part 18 to the system of coordinates of the system using the scanner-to-part transformation parameters from the block 140.

At a block 144, scanner calibration parameters are input from a calibration file provided by the vendor of the scanner apparatus 28 or by an off-line calibration process. These parameters include such things as the precise distance of mirror surfaces 100 and 102 to their respective axes $a_1$ and $a_2$, the precise angle between the normal vector to mirror surfaces 100 and 102 to their respective axes $a_1$ and $a_2$, and the precise distance and angle between axes $a_1$ and $a_2$. The scanner calibration parameters permit scan angles for the laser beam 26 to be calculated from three-dimensional coordinates in the coordinate system of the system. At a block 146, the scanner calibration parameters from the block 144 are applied to the three dimensional coordinates from the block 142, and scan angles for the laser beam 26 are computed. At a block 148 the scan angles are output by the processor 32 to the scanning apparatus control software 128 (FIG. 4) as commands. The scanning apparatus control software 128 accepts single or multiple scan angle commands and processes them to derive low level motion commands that it then sends to the scanning apparatus 28. The scanning apparatus 28 interprets these low level commands, which generates voltages and currents to drive the galvanometers to the appropriate scan angles, and reads the encoders to control the angles in a closed loop. The scanning apparatus 28 reports the encoder angles to the processor 32. The functionality in the software 128 and the scanning apparatus 28 is standard in commercially available galvanometer scanning systems such as the Nutfield Technology Inc. model QuantumScan-30 galvanometer, SurfBoard USB Controller, and WaveRunner software products. An additional channel of control is implemented in one embodiment in which a third mirror is added, and the additional angles are computed and commanded in the same way.

The scanning apparatus control 128 controls all the axes of rotary motion in the scanning apparatus 28. It is the set of software that accepts angle commands, interprets them, and converts them to low level device control commands. The Nutfield Technology, Inc. software WaveRunner is exemplary.

The triangulation algorithms 130 triangulate a centroid of the spot 34 in the system 10B (FIG. 1C). The triangulation algorithms 130 perform triangulation calculations on signals provided by the video cameras 36. Using known triangulation techniques, the triangulation algorithms 130 determine range and three-dimensional coordinates of the spot 34 in the coordinate system of the system 10B.

Figure 6:
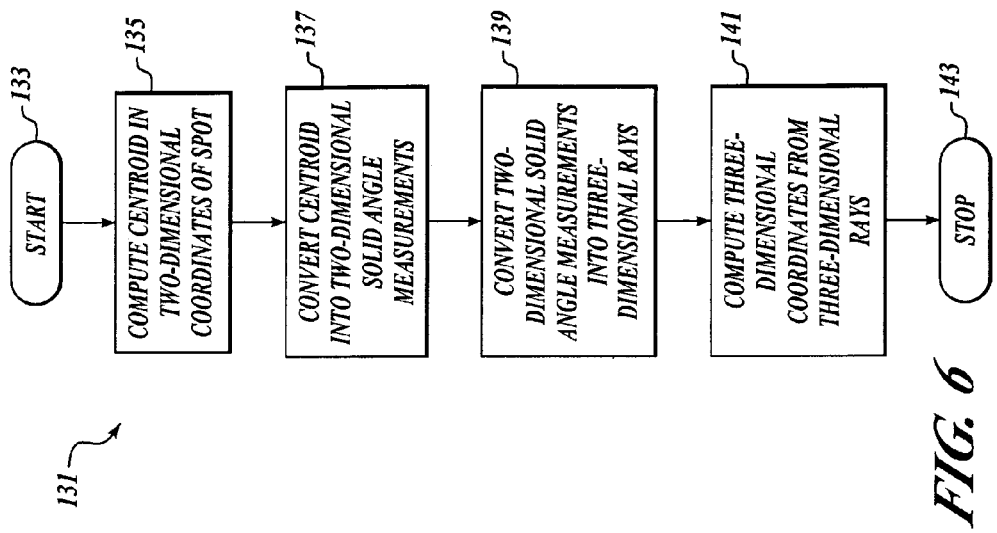
FIG. 6 is a flow chart of an exemplary routine for an image triangulation algorithm.

Referring now to FIG. 6, in one embodiment an exemplary routine 131 implements the triangulation algorithms 130. The routine 131 starts at a block 133. At a block 135, two-dimensional coordinates (that is, a centroid) of the spot 34 (FIG. 1C) within a digital image acquired from each of the video cameras 36 (FIG. 1C) are computed. In one embodiment, by using background subtracted images a linearized mathematical model of a tilted, elliptical, Gaussian spot is fitted to the edges of the target image. In another embodiment, an intensity-weighted-average technique is used to compute the centroid of the spot 34 (FIG. 1C). Fitting the mathematical model of the spot to the edges of the target image is slower than the intensity-weighted-average technique but can be more accurate than the intensity-weighted-average technique. For example, fitting the mathematical model of the spot to the edges of the target image can be around four times slower than the intensity-weighted-average technique but can be up to twice as accurate than the intensity-weighted-average technique. As a result, centroids computed by fitting the mathematical model of the spot to the edges of the target image are computed in image coordinates and can have a typical repeatability of approximately $\frac{1}{200}^{th}$ of a pixel.

At a block 137, the centroid is converted into two-dimensional solid angles. Focal length and distortion characteristics of lenses of the video cameras 36 (FIG. 1C) are used to remove lens distortion and to convert the two-dimensional centroids into solid angle measurements—that is, azimuth and elevation.

At a block 139, the two-dimensional solid angle measurements are converted into three-dimensional rays. Position and orientation of the video cameras 36 (FIG. 1C) in three-dimensional space relative to an externally-defined coordinate system of the system 10B are used to convert the two-dimensional solid angle measurements into three-dimensional rays. The three dimensional rays have origins at the center of the lens of the appropriate video camera 36 (FIG. 1C) and extend through the center of the spot 34 (FIG. 1C).

At a block 141, three-dimensional coordinates are computed from the three-dimensional rays. The three-dimensional rays from the video cameras 36 (FIG. 1C) are combined to compute the three-dimensional coordinates that most closely intersect each ray. It will be noted that each three-dimensional ray provides two constraints, or equations, while the three-dimensional coordinate has three unknowns. Thus, use of two (or more) of the video cameras 36 (FIG. 1C) gives rise to an over determined system of linear equations in three unknowns that can be solved using any one of several known algorithms, such as without limitation Cholesky's method. The routine 131 ends at a block 143.

Referring back to FIG. 4, the image acquisition algorithms 132 control the cameras to acquire images simultaneously into one or more frame grabbers, which acquire and digitize the image data from the cameras, and provide the data in a file or memory available to the processor. This functionality is well known in the art and is available from numerous vendors who supply frame grabbers, such as National Instrument, Inc model NI-IMAQ software that controls a variety of National Instruments, Inc image acquisition boards, such as the model NI-PXI-1428 Image Acquisition product.

The image processing algorithms 134 manipulate digital image data to correct for lens distortion, extract image features relevant for metrology, and provide output to the geometric analysis algorithms. Non-limiting exemplary commercial algorithms are available from National Instruments, Inc, in the product NI Vision Development Module.

The range measurement engine 136 determines range to the part 18 when the laser 12 and range measurement component 20 are provided as a chirped synthetic wave radar, as shown in FIG. 1B. The range to the part 18 is provided in terms of coordinates in the coordinate system of the system. Details regarding the range measurement engine 136 are set forth in U.S. Pat. No. 7,307,700, the contents of which are incorporated by reference.

Referring now to FIGS. 1A, 1B, 2, and 7, exemplary electronic components will be explained. Control voltages are supplied from a field programmable gate array (FPGA) 200, such as without limitation a Xilinx, Inc. model Vortex Pro II 2VP20 chip. A power driver 201, such as a high-speed metal-oxide-silicon (MOSFET) driver like a model IXDD402 available from the Ixys Corporation, receives the control voltages and supplies electrical power to the lasers 12 and 24. The lasers 12 and 24 may be cooled by thermoelectric coolers (TECs) 203.

Figure 7:
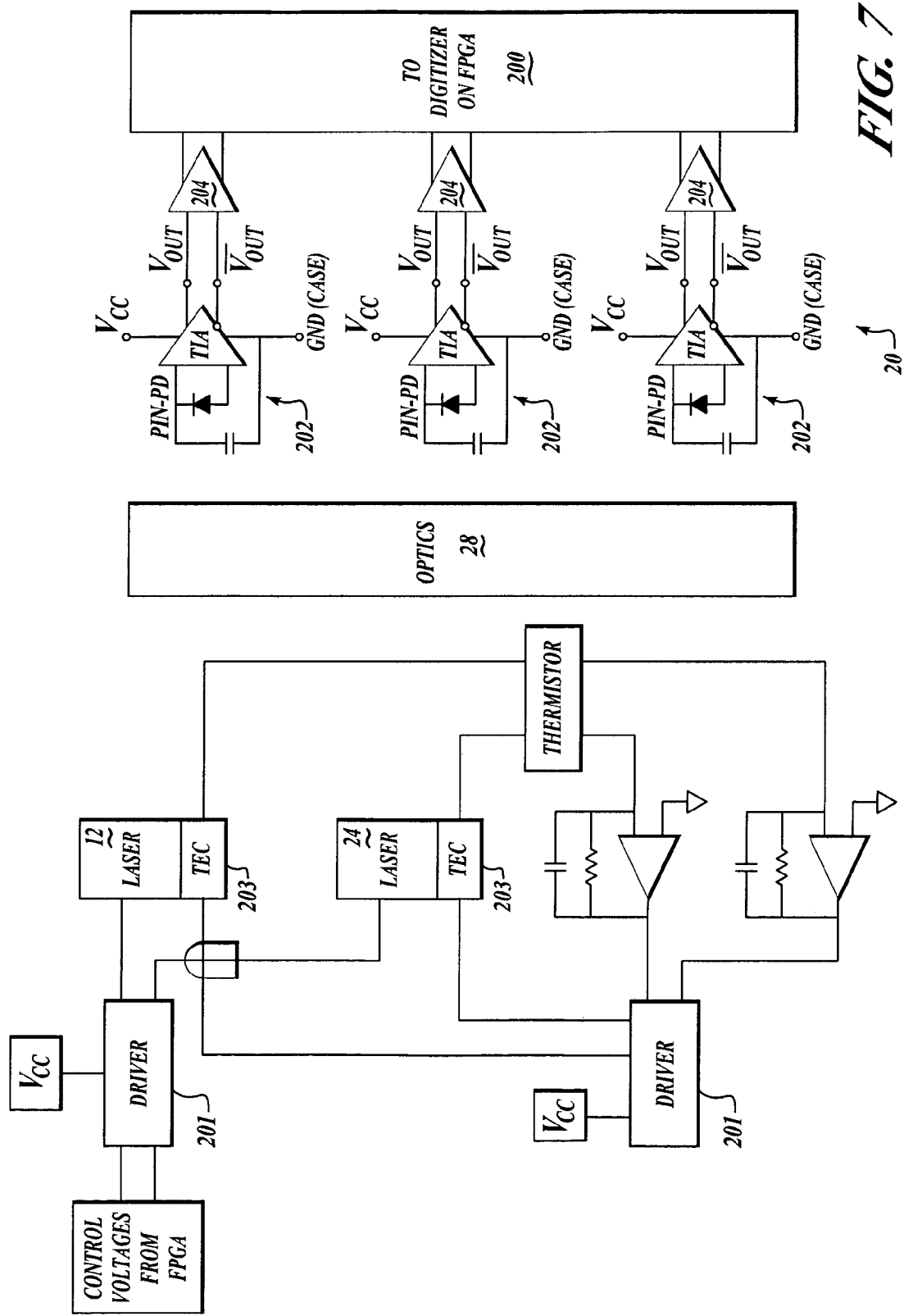
FIG. 7 is a block diagram of exemplary electronic and optoelectronic components of the system of FIG. 1B.

The range measurement component 20 includes photodiodes 202. Each of the photodiodes 202 receives reflections of the laser beam 14 from the surface 16 and outputs a signal that has an amplitude proportional to intensity of the received reflection. While three of the photodiodes 202 are shown in FIG. 7, any number of the photodiodes 202 may be used as desired. Suitable photodiodes may include, by way of non-limiting example, a model EDR 512DRFC2 available from JDS Uniphase.

The signal from the photodiode 202 is input to an amplifier 204. The amplified signal from the amplifier 204 is input to a digitizer (not shown) on the FPGA 200. The digitized signal from the FPGA is processed by the range measurement engine 136 (FIG. 4) to determine range to the surface 18 and to generate three-dimensional coordinates in the coordinate system of the system.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system comprising:
   a first non-time-of-flight laser to determine at least one of position and orientation of a workpiece;
   a projector to project a part definition on the workpiece, wherein the part definition includes a geometric pattern of visible light; and
   common optics to pass beams from the first non-time-of-flight laser and the projector.

2. The system of claim 1, wherein the non-time-of-flight laser includes a laser radar.

3. The system of claim 2, wherein the laser radar includes a chirped synthetic wavelength laser.

4. The system of claim 1, wherein the projector includes a second laser.

5. The system of claim 4, wherein the second laser generates one of a visible laser beam and a near-infra-red laser beam.

6. The system of claim 1, wherein the part definition includes alphanumeric characters.

7. The system of claim 1, wherein the part definition is projected through the common optics in a manner that provides substantially flicker-free viewing of the projected part definition.

8. A method comprising:
   determining at least one of position and orientation of a workpiece with a non-time-of-flight laser;
   projecting a part definition on the workpiece with a projector, wherein the part definition includes a geometric pattern of visible light; and
   passing beams from the non-time-of-flight laser and the projector through common optics.

9. The method of claim 8, wherein determining at least one of position and orientation of a workpiece includes generating a first laser beam.

10. The method of claim 8, wherein projecting a part definition includes generating a second laser beam.

11. The method of claim 8, wherein the part definition includes alphanumeric characters.

12. The method of claim 8, wherein the part definition is projected through the common optics in a manner that provides substantially flicker-free viewing of the projected part definition.

13. A system comprising:
    a non-time-of-flight laser to determine at least one of position and orientation of a workpiece;
    a projector to project a part definition on the workpiece, wherein the part definition includes alphanumeric characters; and
    common optics to pass beams from the non-time-of-flight laser and the projector.

14. The system of claim 13, wherein the non-time-of-flight laser includes a laser radar.

15. The system of claim 14, wherein the laser radar includes a chirped synthetic wavelength laser.

16. The system of claim 13, wherein the projector includes a second laser.

17. The system of claim 16, wherein the second laser generates one of a visible laser beam and a near-infra-red laser beam.

18. A method comprising:
 determining at least one of position and orientation of a workpiece with a non-time-of-flight laser;
 projecting a part definition on the workpiece with a projector, wherein the part definition includes alphanumeric characters; and
 passing beams from the non-time-of-flight laser and the projector through common optics.

19. The method of claim 18, wherein determining at least one of position and orientation of a workpiece includes generating a first laser beam.

20. The method of claim 18, wherein projecting a part definition includes generating a second laser beam.

21. The method of claim 18, wherein the part definition is projected through the common optics in a manner that provides substantially flicker-free viewing of the projected part definition.

* * * * *